US007660397B2

(12) United States Patent
Heen et al.

(10) Patent No.: US 7,660,397 B2
(45) Date of Patent: Feb. 9, 2010

(54) OPTIMISED CONTROL OF TRAFFIC LOAD ON SWITCHES IN A COMMUNICATION NETWORK

(75) Inventors: Kjell Heen, Oslo (NO); Nils Haga, Oppegård (NO)

(73) Assignee: UMS United Messaging Systems, Oslo (NO)

( * ) Notice: Subject to any disclaimer, the term of this patent is extended or adjusted under 35 U.S.C. 154(b) by 453 days.

(21) Appl. No.: 10/984,817

(22) Filed: Nov. 10, 2004

(65) Prior Publication Data

US 2006/0068807 A1 Mar. 30, 2006

(30) Foreign Application Priority Data

Nov. 24, 2004 (NO) .................................. 20043740

(51) Int. Cl.
*H04M 11/04* (2006.01)
(52) U.S. Cl. ....................... 379/40; 455/404.1; 455/466
(58) Field of Classification Search ............. 455/404.1, 455/404.2, 411, 414, 432, 422.1, 458, 466, 455/414.1, 414.2, 414.3, 432.1, 432.3; 379/37, 379/40
See application file for complete search history.

(56) References Cited

U.S. PATENT DOCUMENTS

| 5,278,539 | A  | * | 1/1994  | Lauterbach et al. ..... 340/539.18 |
| 5,628,050 | A  | * | 5/1997  | McGraw et al. ............ 455/12.1 |
| 6,111,867 | A  | * | 8/2000  | Mann et al. .................. 370/337 |
| 6,263,212 | B1 | * | 7/2001  | Ross et al. ................... 455/466 |
| 6,363,052 | B1 | * | 3/2002  | Hosein ........................ 370/230 |
| 6,480,578 | B1 | * | 11/2002 | Allport ........................ 379/48 |
| 6,594,345 | B1 | * | 7/2003  | Vinson ........................ 379/48 |
| 6,745,021 | B1 | * | 6/2004  | Stevens .................... 455/404.1 |
| 6,788,781 | B2 | * | 9/2004  | Shtivelman ................ 379/309 |
| 6,920,204 | B1 | * | 7/2005  | Tuttle ...................... 379/88.16 |
| 7,187,758 | B2 | * | 3/2007  | Trinkel et al. ................ 379/37 |
| 7,194,249 | B2 | * | 3/2007  | Phillips et al. ........... 455/404.1 |
| 2002/0159576 | A1 | * | 10/2002 | Adams ........................ 379/133 |
| 2002/0176545 | A1 | * | 11/2002 | Schweitzer .................. 379/37 |
| 2003/0032409 | A1 | * | 2/2003  | Hutcheson et al. .......... 455/414 |
| 2004/0053624 | A1 | * | 3/2004  | Frank et al. ................. 455/453 |
| 2004/0103158 | A1 | * | 5/2004  | Vella et al. .................. 709/206 |
| 2006/0049934 | A1 | * | 3/2006  | Breen ......................... 340/531 |

FOREIGN PATENT DOCUMENTS

EP          1220522         7/2002

* cited by examiner

*Primary Examiner*—Olisa Anwah
(74) *Attorney, Agent, or Firm*—Christian Abel

(57) ABSTRACT

The invention relates to a method and a system for optimised resource use of one or more selected switches in a communication network for alerting the population when an undesirable event occurs in a specific geographical area by means of messages transmitted via the switches. The switches may form a part of a fixed telephone network and/or a mobile telephone network.

12 Claims, 8 Drawing Sheets

OPTIMISED CONTROL OF TRAFFIC LOAD ON SWITCHES IN A COMMUNICATION NETWORK

FIELD OF THE INVENTION

The present invention describes a method and a system for carrying out effective warning of the population in a specific geographical area. In more specific terms, a method and a system are described for optimised control of traffic load in the form of connected messages on one or more switches in a fixed telephony and/or mobile telephony communication network.

BACKGROUND TO THE INVENTION

The problems associated with disasters and accidents are receiving an ever-increasing amount of public attention. Much of this is connected with the way in which society has developed into a communication society. The media seize on such events, thereby helping to inform the population that a disaster and accident has occurred. Society, moreover, has become much more complex, and in most cases people are involved in or directly or indirectly affected by a disaster or accident. People may experience disasters or accidents in their homes, at their place or work, or when travelling by various forms of transport. Situations may also arise in towns, in densely built-up areas, on roads, in transport systems as well as in buildings, in factory works, etc. Transport of goods, the use of aircraft, busses and trains may also result in undesirable events. Weather conditions such as, for example, tornadoes, floods, rain, lightning, pollution, etc. are also a cause of disasters and accidents. In addition to this, epidemics or other diseases may occur involving one or more people. All of these situations give grounds for providing timely and necessary information to those involved, whether they be individuals in the midst of the disaster or accident, the relief team on the way to a situation or located on the spot or within the accident or disaster area, or persons or groups such as families, businesses, organisations, etc. requiring or needing information. Exercise-type situations may also be involved or situations where for social reasons the necessary planning must be carried out in advance of a likely disaster or accident, where there is a need to supervise and control the flow of information.

A special characteristic of disasters and accidents is to be able to ensure and safeguard the need for information by means of telecommunication. In this context, telecommunication refers to fixed telephony and communication by means of terminals such as mobile telephones and/or PDA's. When a disaster or accident goes through its cycle from start to finish, a great need is created for information to and between the parties involved, as well as incoming and outgoing communication.

Furthermore, problems often arise with the communication infrastructure, such as, for example, when communication exchanges and switches are knocked out or literally overwhelmed by the fast and uncontrolled build-up of requests for new network connections of data communication and/or calls, together with implementation of ongoing data exchanges and calls. There is a need to control and optimise message exchange via several switches in a network in situations involving undesirable events as described above.

Patents exist involving various aspects of communication supervision and control during an event such as an accident or disaster, where there is a wish to control and supervise the communication via a switch.

U.S. Pat. No. 6,169,894 describes how geographically determined information can be passed to a mobile telephone. The patent describes a broadcasting method, "outbound broadcasting", where the network capacity can be maximised. The method can temporarily overrule the mobile telephone, provided the mobile (the user) has made himself available to the service.

U.S. Pat. No. 6,694,132 describes a method for "outbound broadcasting" which is geographically determined, where one communicates via a fixed and mobile telephony network. Databases, graphic information and text/voice messages form the basis for actions. The telephone operator performs the broadcasting. Broadcasting is primarily operated by the area's dialing code (i.e. focussed on fixed telephony).

Each of the patents and their articles discussed above are hereby included in this patent application as references.

A significant drawback of these patents is that they fail to arrange for an optimal message exchange via one or more switches by controlling and optimising the communication load via the selected switches.

The trouble with today's solutions is that on account of the development or scope of the disaster or accident, problems may be encountered in alerting a selected population group via a fixed and/or mobile telephony network within the geographical areas affected by the situation.

The capacity of the telephony infrastructure in the various countries such as, for example, Norway and internationally is developed according to population density and anticipated communication requirements. For example, a small municipality with a population of 5-6000 inhabitants seldom has the capacity to handle more than 2-300 simultaneous calls. A warning that does not deal with scaling in relation to receiving capacity can thereby completely overload the network, resulting in unpredictable consequences such as, for example, where critical outgoing telephone traffic cannot get through.

Thus a highly specific and obvious need exists to take care of, control and optimise the communication via a switch related to a disaster or accident.

The present invention takes care of this function.

SUMMARY OF THE INVENTION

The present invention describes a method and a system for controlling and optimising message exchange via one or more switches in a communication network, which may consist of fixed telephony and/or mobile telephony switches within a geographical area.

The method describes how a method is provided for control and optimisation of messages sent via one or more switches in a network.

The method and the system are described in greater detail in the associated set of claims.

DETAILED DESCRIPTION OF THE INVENTION

The invention will now be described in more detail with reference to the figures, in which.

Figure 2:
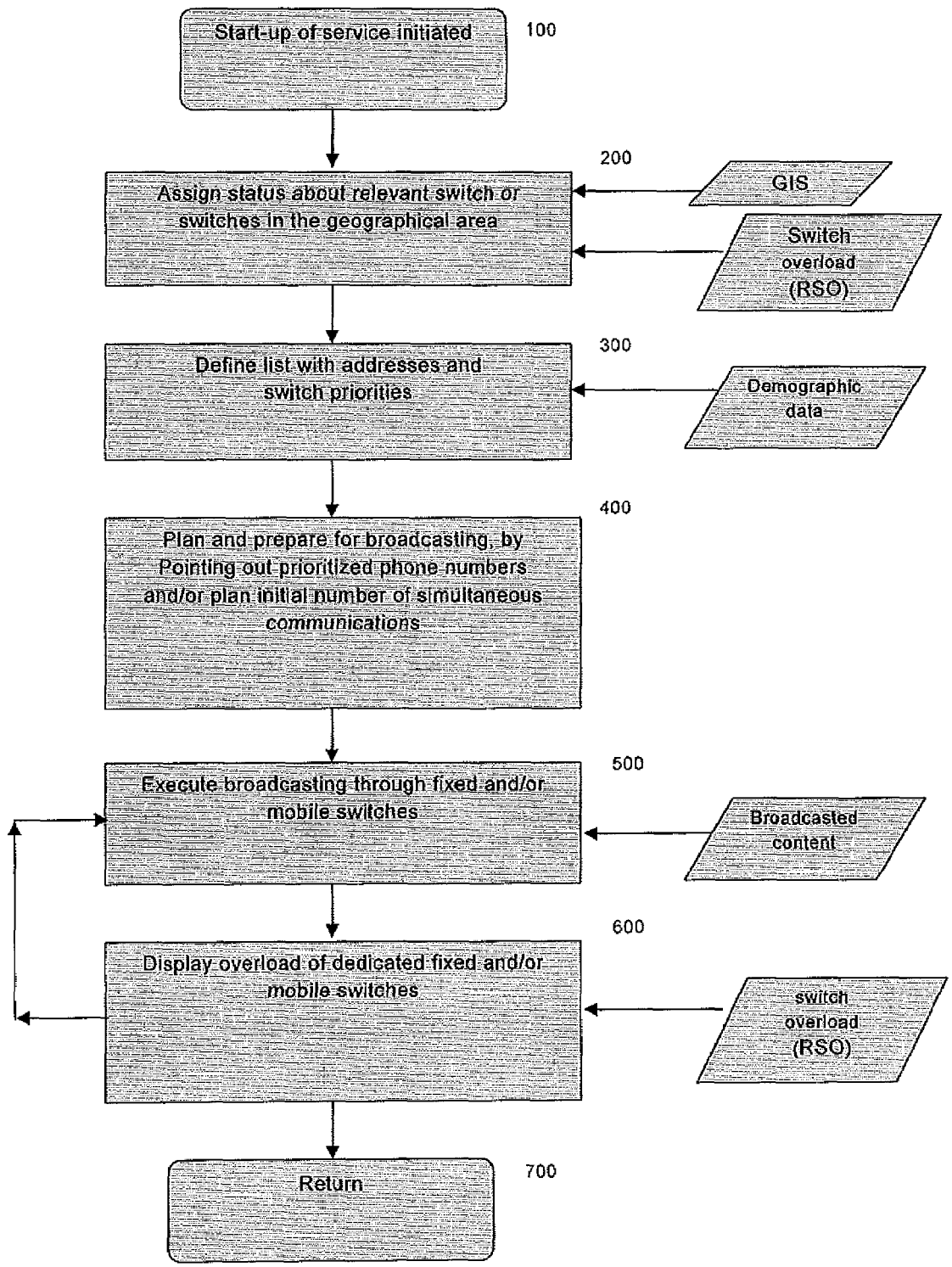
FIG. 2 is a flow chart illustrating the process that is carried out.
Figure 3:
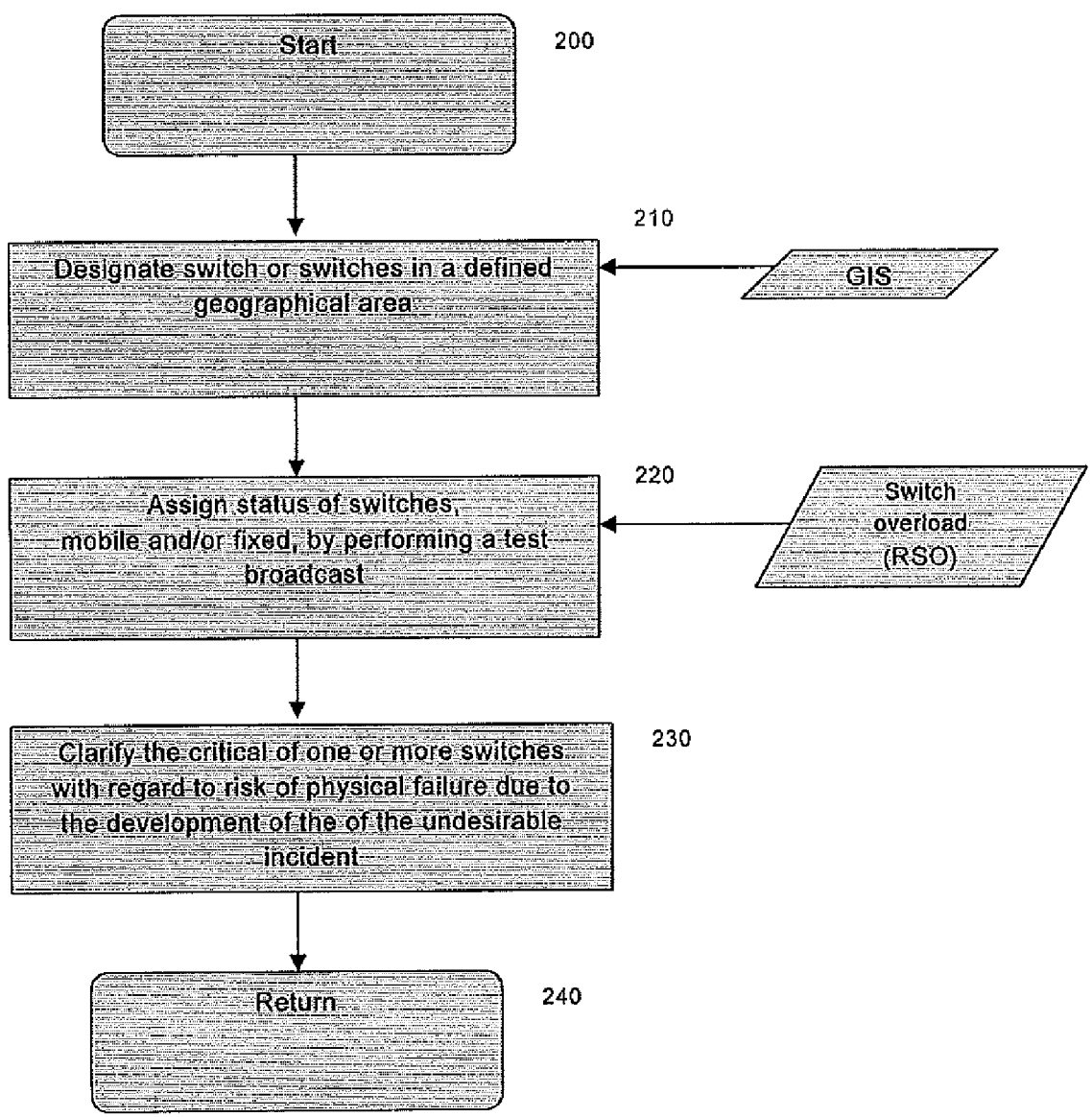
Figure 4:
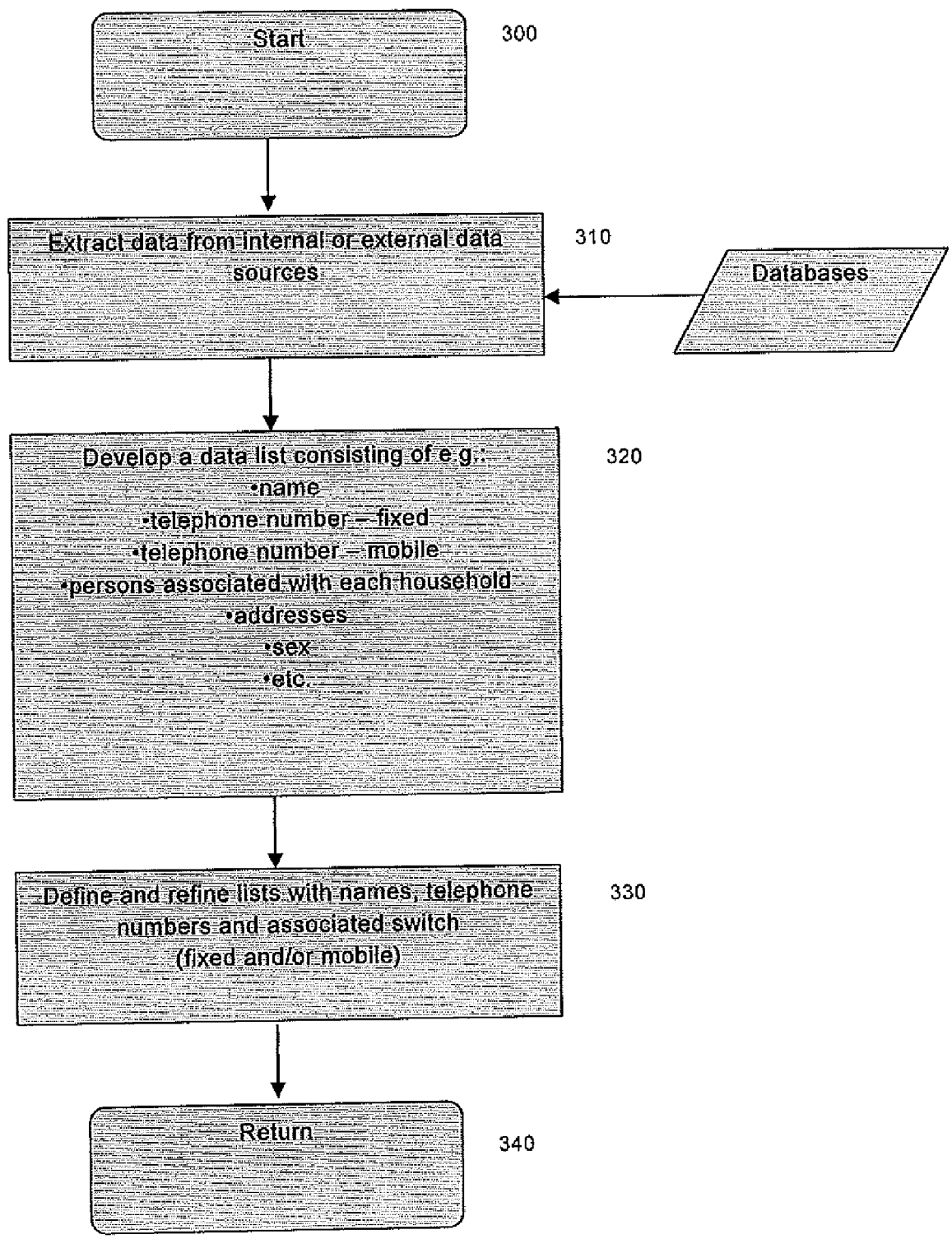
Figure 5:
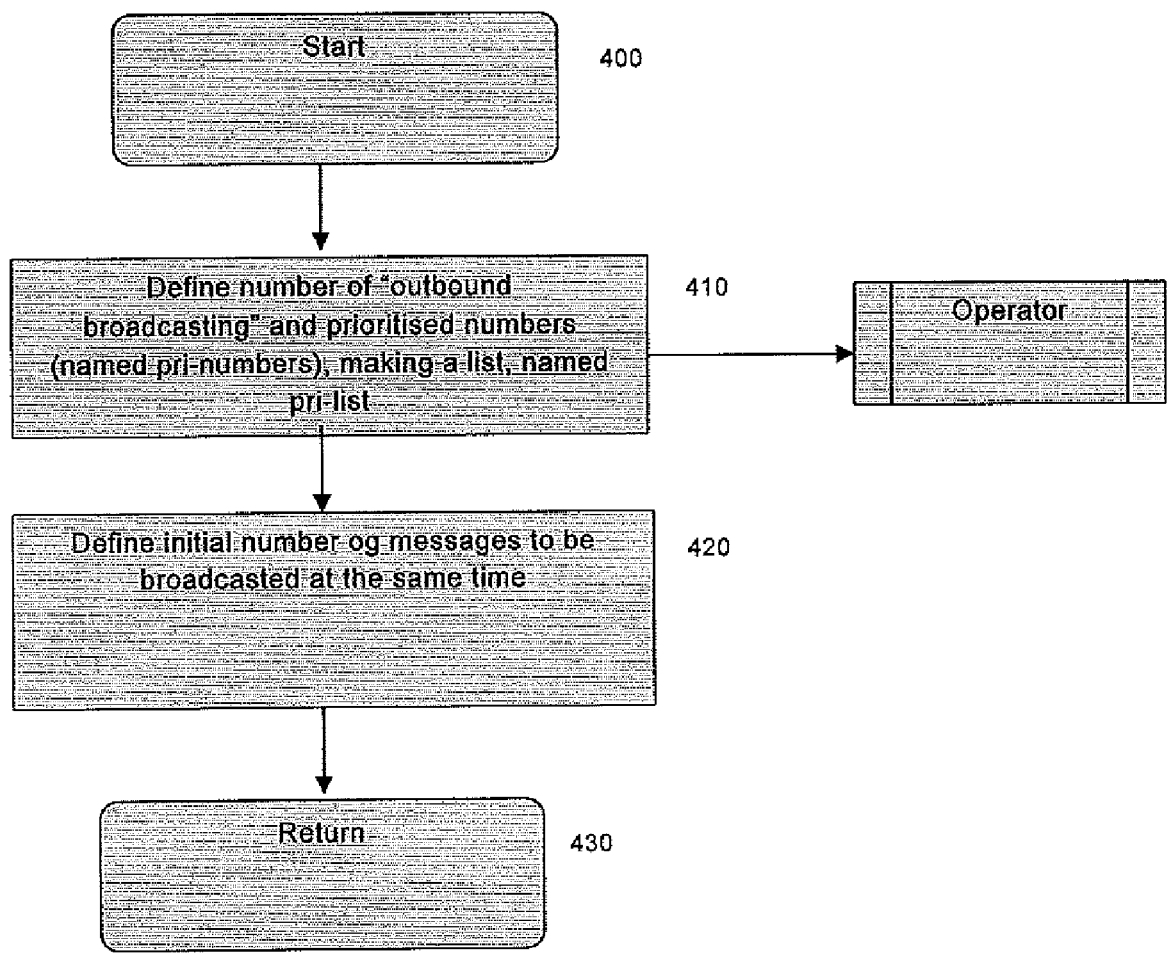
Figure 6:
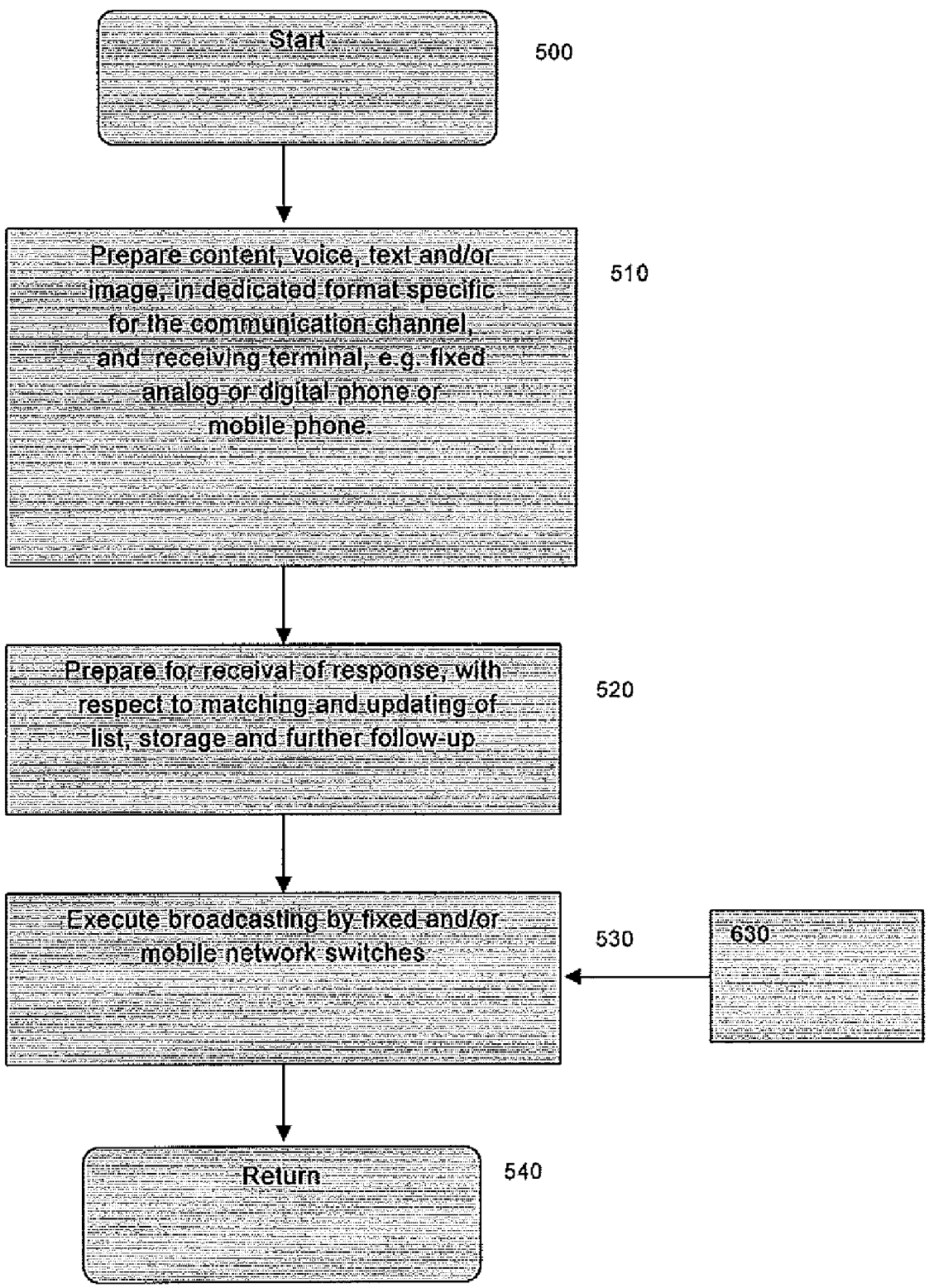
Figure 7:
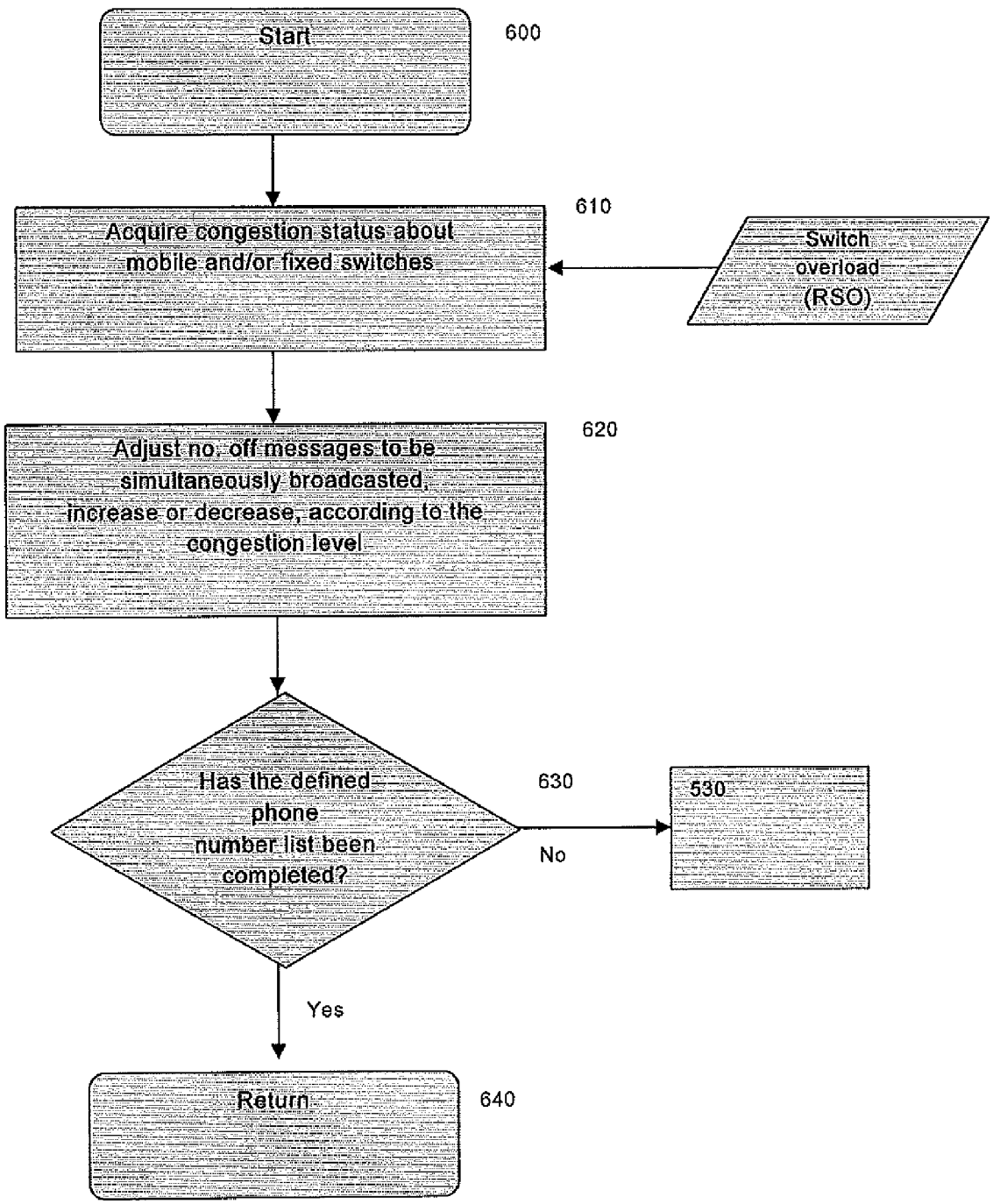
Figure 8:
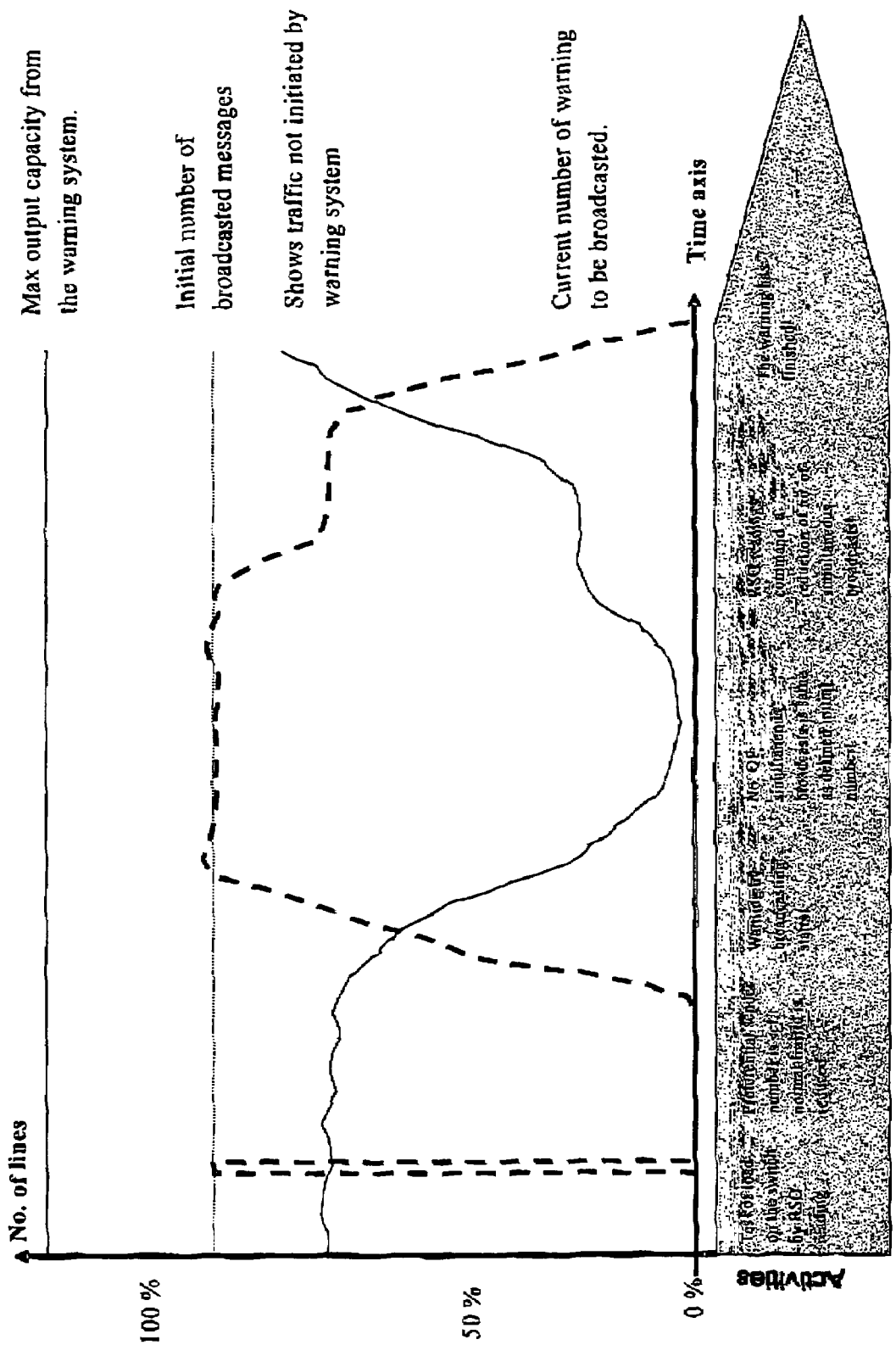

FIG. 3 is a flow chart elaborating on step 200 in FIG. 2.
FIG. 4 is a flow chart elaborating on step 300 in FIG. 2.
FIG. 5 is a flow chart elaborating on step 400 in FIG. 2.
FIG. 6 is a flow chart elaborating on step 500 in FIG. 2.
FIG. 7 is a flow chart elaborating on step 600 in FIG. 2.
FIG. 8 illustrates the course of a warning.

The method according to the invention consists of main elements, which will now be described in greater detail. The main elements form a link in a continuous process, which will proceed as long as considered advisable for an undesirable event such as a disaster, accident or exercise.

Figure 1:
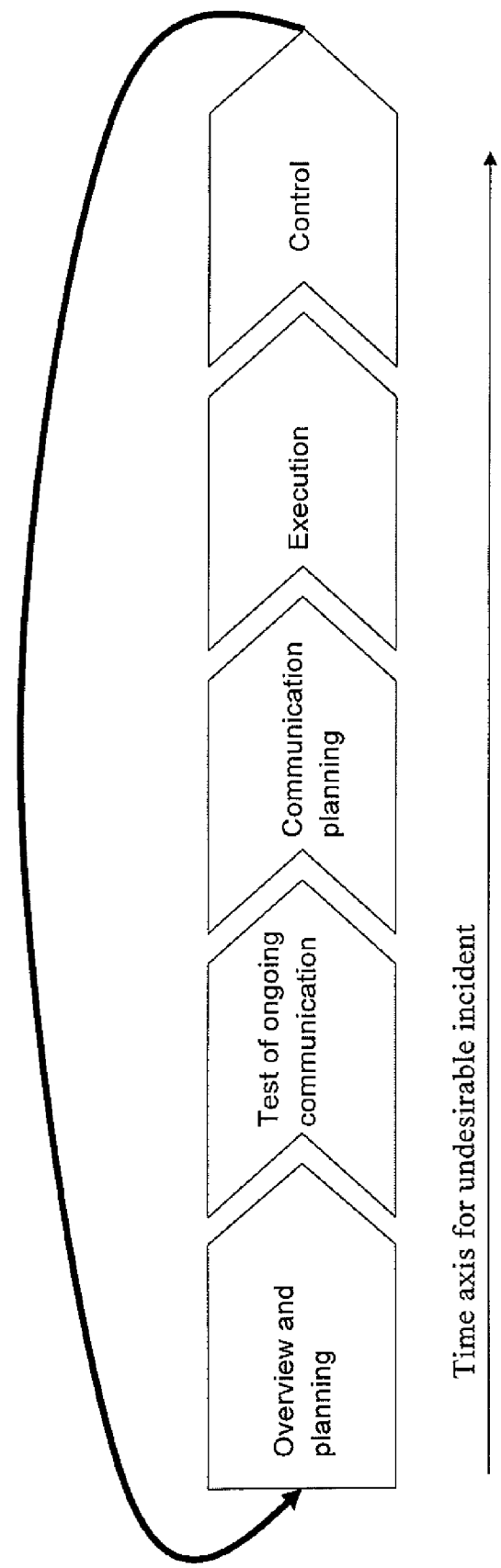
FIG. 1 illustrates the course of process control of an undesirable event.

FIG. 1 indicates how modules are joined together to form one process, which consists of a method with several steps, plus a system for executing the method.

The first module in FIG. 1 is described as "Overall view and planning", and is characterised by a method for establishing an overall view and planning measures. This may contain a database with, for example, telephone numbers, names and addresses, combined with, for example, a GIS (Geographical Information System) system.

A second module is described as "Test of ongoing communication" and is characterised by a method for revealing the load via a fixed and/or mobile network associated with the geographical area. This is done in the form of a test by transmitting a representative number of messages in order to reveal the resulting load.

A third module is described as "Communication planning" and is characterised by a method for arranging communication.

A fourth module is described as "Implementation" and is characterised by a method for delivering messages or delivering messages where an answer is expected.

The fifth and final module is described as "Control" and is characterised by a method for revealing the degree of communication density based on actions.

All the modules illustrated in FIG. 1 together create a total solution for controlling and optimising message exchange via one or more switches when an undesirable event occurs. The present invention is based on the process, methods and selected systems, which together create a whole.

The module "Overall view and planning" is based on existing systems that can deliver information of a geographical and demographic nature, together with lists of people with data such as, for example, telephone number. The module should be able to supply information on individuals, based on their role or duties during a disaster or accident, i.e. involving relief or support personnel, people responsible for critical public services such as electricity supply, water supply, traffic flow, etc., together with information on occupants per household, employees in various work places, those present on a permanent or temporary basis such as, for example, visitors, employees etc. located within a given geographical area. By means of various techniques the module should be able to compare qualified lists that form the basis for deciding priority of communication such as, for example, in the form of message transmissions to message transmissions where a specific acknowledgement is required.

The module "Test of ongoing communication" is characterised by a method for revealing as soon as possible the degree to which a switch or a network of switches is loaded with regard to communication. Based on this, further measures may be taken, such as, for example, terminating calls and/or establishing priority lists of those who can be permitted to transmit messages and thereby establish calls. By reading the status of RSO (Remote Switch Overload), an overall view is obtained of the loading on switches within a selected geographical area. During the development of an undesirable event, communication can often grow in an uncontrolled manner. For this reason it is vital to establish control of the situation quickly as a basis for planning and implementing the further activities and measures.

The module "Communication planning" is characterised by a method for assigning destination addresses for an order of priority for warning. By performing an advance grouping of telephone numbers evenly distributed over available switches within the selected geographical area, the chance of overloading the network is reduced.

The module "Implementation" is characterised by a method for starting up the actual message transmission for a geographical area, distributed between one or more selected switches. The method contains elements of control and optimisation of message exchange via one or more switches, beginning with transmitting a number of simultaneous messages defined, for example, as the initial number. The number of messages transmitted can be adjusted upwards or downwards depending on the load on the switches involved.

In the module "Control" the opportunity is given to monitor the load on the communication by means of RSO. Based on the load revealed, the message exchange can be optimised by increasing or reducing the number of simultaneous messages. This will be an iterative process as long as there is a need to inform selected groups of the population.

FIG. 2 is a flow chart illustrating the process implemented according to the invention, where the basis is created in a systematic manner for controlling and optimising the message exchange via one or more switches in a network within a geographical area. The figure represents the process described in FIG. 1.

The process starts at step 100 with activation and initiation. In step 200 the status of relevant switches is established by, for example, performing a test where a number of messages are transmitted simultaneously. The load within the geographical area is thereby clarified by reading RSO (Remote Switch Load) from the area's switches. The status can be presented together with other relevant data in a GIS (Geographical Information System) system. Important information such as buildings, roads, etc. can be entered in a GIS system, thus providing a fast, overall view of the selected geographical area. The GIS system will form the basis of a decision support tool during the undesirable event or the exercise.

In step 300 a qualified list of names and telephone numbers is established, which will deliver messages by means of broadcasting technology. The list is developed by means of access to various databases, which, for example, may contain demographic data.

In step 400 the implementation is prepared of a message exchange to selected telephone numbers. Depending on anticipated or actual revealed load on the network's switches, a list can be defined of originator telephone numbers that will receive the highest priority when calling via selected switches. These prioritised telephone numbers are called pri-numbers. Together the pri-numbers will form a pri-list. The pri-list must be sent to one or more selected network operators, who implement the pri-list on the switches within the selected geographical area. An alternative or complementary measure may be for the operator to go in and terminate all or selected connections. The content of the message that has to be broadcast is compared. The message may be of the information type or a reply can be expected in the form of, for example, a keystroke on the telephone or a verbal confirmation.

In step 500 an implementation is performed of the planned broadcasting via fixed and/or mobile switches. This is done by simultaneously ringing an initially defined number of telephone numbers. This initial number is based on a set of rules. Calling and broadcasting of messages is a continuous process. The number of simultaneous calls is adjusted as the degree of load on the switches involved is revealed. The number of calls at any time is thereby optimised, thus enabling the greatest possible number of messages to get through as quickly as possible to the appointed list of telephone numbers through the network.

In step 600 the status of ongoing message exchange is displayed, controlled and optimised. The degree of loading on one or more switches is revealed by retrieving data from RSO. Based on the revealed load, the number of simultaneous message exchanges is adjusted upwards or downwards. These changes are undertaken on the basis of a set of rules. Based on the new figure for total number of simultaneous message exchanges, message exchange continues as indicated in step 500 until the system has worked its way through the selected list of telephone numbers.

FIG. 3 elaborates on step 200, which starts up a process 210 where a specific geographical area with associated switches is selected where an undesirable event or exercise is expected to occur or has occurred. A GIS system is employed, for example, to give information on location of switches, infrastructure, population matters, etc. In step 220 a test is carried out with a view to revealing the load on any switches in an indicated geographical area. The test is performed by transmitting a simultaneous number of messages based on a set of rules. Based on this, the communication status of the selected switch or switches is deduced by reading issued RSO messages. In the next step 230 any risk of drop-out of one or more switches is clarified based on the scope and development of the undesirable event. There may be a need to complement or replace switches, for example by a transportable switch within the geographical area concerned. In step 240 the process continues to step 300 as illustrated in FIGS. 2 and 4.

FIG. 4 elaborates on step 300. In step 310 data consisting of telephone numbers, subscribers, etc. are extracted based on various external and/or internal databases. A list is developed, which may be dynamic or static, giving a survey of which telephone numbers (fixed and mobile) have to be contacted and any names of subscribers, number and names of persons associated with the telephone number, address, gender, age, etc. In step 320 a total list is established consisting of, for example, telephone numbers, name and address. The said list specifically represents all those with whom communication has to be made, and the list forms a total overall view from which to begin a stepwise communication exchange, where those who are most at risk are selected, etc. In step 330 selection and structuring of the list are performed via telephone numbers based on a set of rules.

An example of strategy is to exploit the fixed telephone numbers' identification of switch, i.e. a part of a fixed telephone number indicates a switch assigned to a regional area. In other words fixed telephone numbers are grouped according to localisation of switch number with a regional location. There will usually be a network of mobile transmitters in a geographical area. Mobile transmitters are very prone to overload during disasters, accidents and exercises. When transmitting messages, the possibility exists of cooperating with network operators to influence or guide messages to a selected mobile transmitter, thus optimising the message transmission and making the most of the network capacity. In step 340 the process continues to step 400 as illustrated in FIGS. 2 and 5.

FIG. 5 describes in step 410 how to prepare transmission of a message by defining a list consisting of prioritised originator telephone numbers. Each such prioritised originator telephone number is called a pri-number. A pri-number is a number that always receives priority when calling via a specific switch. The said pri-list is transmitted to the network operator(s) who implement the pri-list on one or more selected switches. In order to free capacity on one or more switches, both fixed and mobile, ongoing calls may be terminated in collaboration with network operators, thereby freeing capacity for a meaningful message exchange. In step 420 the number of simultaneous messages that are to be broadcast is defined. This number is based on the test that may have been carried out in step 220. One usually begins with an initial number of calls, based on a set of rules. The set of rules may be based on experience, type of switch and network, population size, etc. In step 430 the process continues to step 500 as illustrated in FIGS. 2 and 6.

FIG. 6 describes with step 510 how to prepare the content of the message, for example as speech, text and/or image, together with any anticipated response. The message and its content must be adapted to the receiver's terminal, for example a mobile telephone or fixed telephone. In step 520 the system is arranged for logging and storing responses from the receiver to received messages. This response can be exported for further processing or it can be matched against the original list, thus permitting quality assurance of the person with whom contact has been established and their specific answer. An example of the type of response may be that the receiver is asked to press key 1 in order to hear the message again, key 2 for medical assistance, etc. In step 530 the simultaneous message exchange is performed according to the plans that have been made. The transmission takes place by message exchanges being transmitted simultaneously to the extent initially defined. As the message is received and terminated by the individual receiver, new message exchanges are continuously being initiated, thus maintaining the defined number of simultaneous exchanges. In step 540 the process continues to step 600 as illustrated in FIGS. 2 and 7.

FIG. 7 describes how to reveal the degree of load on the switch(es) in the selected geographical area as a result of the ongoing message exchange. Step 610 reads the status from RSO for the individual switches, both fixed and/or mobile telephony. In step 620 the extent is clarified to which the number of simultaneously ongoing calls should be increased or reduced as a consequence of the status of the load (congestion). This is a control and optimisation of message exchange based on a set of rules. The object is to have information distributed as quickly as possible to the defined list via telephone numbers within a geographical area. As long as there are telephone numbers that have to be contacted, it is decided in step 630 whether further ringing of telephone numbers should continue. If this is the case, the process will continue in step 530 as illustrated in FIG. 6. In step 640 the process is terminated as illustrated in step 700 in FIG. 2.

FIG. 8 illustrates the course of a warning. This may, for example, be during an exercise. Alerting a population group in a selected geographical area should be performed via fixed and/or mobile telephony based on the present invention.

A test is carried out by transmitting a number of simultaneous messages. The object is to reveal the load on the relevant switch. By reading the received RSO message, the ongoing communication load via the relevant switch is revealed. In this example the option is chosen to transmit a number of messages, so-called initial value, based on experience and knowledge of the switch and the location. An alternative option is to transmit a lower or higher number of messages. By reading RSO the degree of load is revealed. There may, for example, be a need to perform more tests before implementing the actual message transmission.

Depending on the degree of load revealed, the level of the simultaneous number of messages to be broadcast is selected. In this case the initial number of messages, i.e. the initial value, is maintained.

The message broadcasting is undertaken from defined priority numbers, i.e. pri-numbers. These numbers are given priority over other numbers that might try to make a call via the appointed switch.

As normal traffic is reduced by calls being terminated, the corresponding number of ongoing message transmissions at any time increases. The number increases until the defined initial value of number of broadcasts is attained.

The degree of load (RSO) is read continuously. Depending on changes or the level of the load, the number of ongoing message transmissions at any time can be adjusted upwards or downwards. In this case the number is adjusted downwards, since it was revealed by the RSO reading that the degree of load on the switch had increased.

The message transmission is terminated. A message transmission has therefore been implemented to a defined list of receivers. Depending on the degree of success in coming into contact with all the receivers, several calls may have been made to the numbers where attempts to establish contact were unsuccessful. Finally, the status is summed up and those receivers with whom it was not possible to establish contact are transferred, for example, to a new list for further processing.

The number of ordinary calls increases as the availability via the switch increases.

Depending on the development of the situation, the course of events described here may be repeated several times to the same receivers or to new receivers.

The invention claimed is:

1. A method for optimizing control of traffic load in the form of connected messages on one or more switches in a fixed telephony and/or mobile telephony communication network for maximum exploitation of the capacity of the switch (es) when broadcasting content regarding an undesirable event in a specific geographical area associated with the switch(es), characterised in that the method comprises the following steps:
    a) establishing information on who is located within the geographical area in question;
    b) assigning load status on relevant switch(es) in the geographical area in question by performing a test transmission with simultaneous calls, and reading the status of RSO (Remote Switch Overload);
    c) clarifying the content to be broadcasted, and implementing broadcasting;
    d) monitoring the load on the switch(es);
    e) changing the number of message exchanges as a result of revealed load status on the switch(es).

2. A method according to claim 1, characterised in that the steps are repeated as long as an undesirable event is of such a nature that it is important to be in control of the situation.

3. A method according to claim 1, characterised in that the method comprises an additional step before step c) involving establishment of a list (pri-list) with prioritised telephone numbers (pri-numbers) which should be given the highest priority when executing a message by calling via a switch.

4. A method according to claim 1, characterised in that step a) comprises generating lists of key persons when an undesirable event occurs, where the lists form the basis for what and to whom information should be broadcast.

5. A method according to claim 1, characterised in that step b) further comprises optimised control of the number of simultaneous calls of message exchanges, the number being increased or reduced as a result of the revealed load on a related switch and based on a set of rules.

6. A method according to claim 3, characterised in that the additional step comprises generating lists of relevant telephone numbers when an undesirable event occurs, where the lists form the basis for who should be given priority on the switch(es) in question.

7. A method according to claim 5, characterised in that the set of rules comprises the use of empirical data, geographical location, demographic data, time and which phase an undesirable event is in, which together will decide whether ongoing calls should be stopped or rerouted to a switch with a lower load.

8. A method according to claim 3, characterised in that the clarification of switch(es) for broadcasting in step c) is based on the defined list of addresses and switch priorities, and comprises the use of batch or sequentially operated broadcasting, or broadcasting with a time window for acknowledgement.

9. A method according to claim 1, characterised in that step c) comprises arranging the content to be broadcast in such a manner that it is adapted to the specific format required for the relevant communication channel, and preparation for receipt of confirmation of broadcast message in order to be able to update the list of addresses and switch priorities for further follow-up.

10. A method according to claim 1, characterised in that step d) comprises assigning information on successful broadcasting, response from relevant receivers of the message and updating of the original pd-list that appeared at the start of the method.

11. A system comprising switch(es), processing device and known devices required in a fixed and/or mobile telephony network, characterised in that the system is arranged to carry out the method according to any one of claims 1 to 4, or 5 to 10.

12. A computer program residing on a storage medium or in a computer memory, for execution of a processing device connected to a switch in a communication network, characterised in that the program comprises a set of instructions arranged to carry out the method according to any one of claims 1 to 4, or 5 to 10 by execution on the processing device.

* * * * *